US011334253B2

(12) United States Patent
Trika

(10) Patent No.: US 11,334,253 B2
(45) Date of Patent: May 17, 2022

(54) STORAGE SYSTEM THAT PROVIDES PROTECTION LEVELS AT STORED DATA ITEM GRANULARITY

(71) Applicant: Intel Corporation, Santa Clara, CA (US)

(72) Inventor: Sanjeev N. Trika, Portland, OR (US)

( * ) Notice: Subject to any disclaimer, the term of this patent is extended or adjusted under 35 U.S.C. 154(b) by 0 days.

(21) Appl. No.: 16/213,642

(22) Filed: Dec. 7, 2018

(65) Prior Publication Data

US 2019/0114096 A1    Apr. 18, 2019

(51) Int. Cl.
*G06F 3/06* (2006.01)
(52) U.S. Cl.
CPC .......... *G06F 3/0619* (2013.01); *G06F 3/0604* (2013.01); *G06F 3/0644* (2013.01); *G06F 3/0653* (2013.01); *G06F 3/0689* (2013.01)
(58) Field of Classification Search
CPC .... G06F 3/0619; G06F 3/0644; G06F 3/0604; G06F 3/0689; G06F 3/0653
See application file for complete search history.

(56) References Cited

U.S. PATENT DOCUMENTS

| | | | | |
|---|---|---|---|---|
| 2005/0132212 A1* | 6/2005 | Haswell | ................. | G06F 3/0619 713/193 |
| 2012/0079424 A1* | 3/2012 | Rogers | ................. | G06F 11/2094 715/810 |
| 2015/0324285 A1* | 11/2015 | Murphy | ............... | G06F 12/0292 711/6 |
| 2016/0179421 A1* | 6/2016 | Hwang | ................. | G06F 3/0619 711/162 |
| 2016/0217823 A1* | 7/2016 | Arslan | ................ | G06F 11/1008 |
| 2018/0088856 A1* | 3/2018 | Yu | ......................... | G06F 3/0604 |
| 2019/0042114 A1 | 2/2019 | Mesnier et al. | | |
| 2019/0042441 A1 | 2/2019 | Burridge et al. | | |

OTHER PUBLICATIONS

Duo, et al., "High-Density Image Storage Using Approximate Memory Cells", Proceedings of the International Conference on Architectural Support for Programming Languages and Operating Systems (ASPLOS), 2016.
Jevdjiic, et al "Approximate Storage of Compressed and Encrypted Videos", ASPLOS'17, Proceedings of the Twenty-Second International Conference on Architectural Support for Programming Languages and Operating Systems, pp. 361-373, Xi'an China, Apr. 8-12, 2017.
Sampson, Adrian "Approximate Storage in Solid-State Memories", MICRO'46, Dec. 7-11, 2013, Davis, CA., 12 pages.

* cited by examiner

*Primary Examiner* — Masud K Khan
(74) *Attorney, Agent, or Firm* — Haley Guiliano LLP

(57) ABSTRACT

An apparatus is described. The apparatus includes a storage system management unit to manage a storage system having physical storage resources divided into different reliability zones. A data item to be stored in the storage system is to be assigned a particular reliability level by the management unit and is to be stored by the management unit in one of the reliability zones that is to provide a level of protection against data loss that is at least as protective as the particular reliability level.

15 Claims, 4 Drawing Sheets

STORAGE SYSTEM THAT PROVIDES PROTECTION LEVELS AT STORED DATA ITEM GRANULARITY

FIELD OF INVENTION

The field of invention pertains generally to the computing sciences, and, more particularly, to a storage system that provides protection levels at stored data item granularity.

BACKGROUND

As the need for storage continually expands, storage systems should be able to provide adequate storage treatment for different kinds of data. As different kinds of data are adequately protected by different levels of protection against data loss, emerging storage systems ideally should be able to provide different protection levels to different items of data.

FIGURES

A better understanding of the present invention can be obtained from the following detailed description in conjunction with the following drawings, in which.

DESCRIPTION

Figure 1:
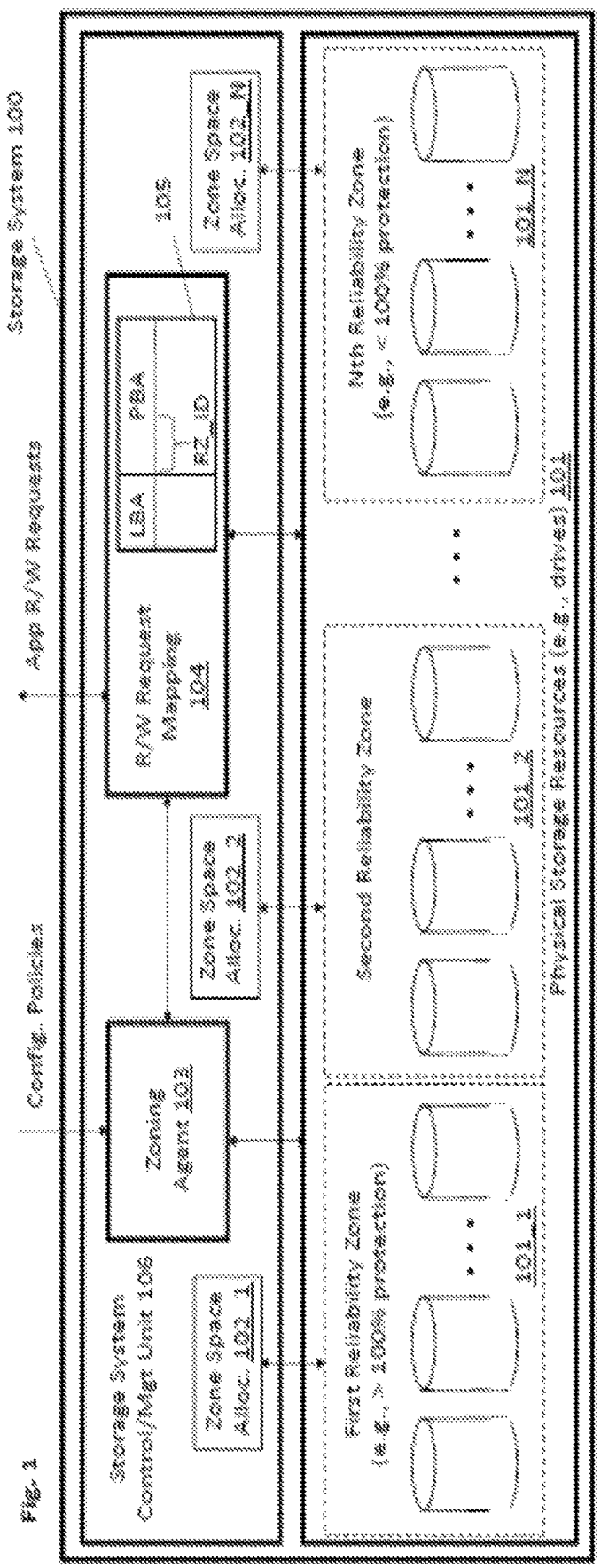
FIG. 1 shows a storage system having different reliability zones.

Users and/or software programs rely upon one or more non volatile mass storage systems to keep data. Here, a singular non volatile mass storage system is recognized by one or more physical storage resources having an associated storage capacity (e.g., one or more solid state drive(s), one or more magnetic hard disk drive(s), etc.), and, a particular addressing scheme for accessing the data within the physical storage resources.

In the case of a traditional file system, the addressing scheme articulates a root directory, a lower directory and/or file path, and a target file where the data item is to be kept. Here, items of data that are stored in different target files of a same storage system are stored under the same root directory but have different lower directories and/or filepaths the lead to their respective target files. In the case of an object storage system, the addressing scheme corresponds to an object identifier (object_ID) where each different data item that is stored in the storage system has a unique object_ID. A data item is a basic, granular unit of content to be stored (e.g., an image, a video file, a document, a file containing multiple documents, etc.). Generally, read/write requests are directed to data units individually.

When a software program (e.g., an application software program, an operating system software program, a virtual machine software program, a virtual machine monitor software program, a device driver software program, etc.) reads/writes data from/to a storage system, the software program code expresses the location of the data in conformance with the storage system's addressing scheme. The expression is then treated by the storage system as a logical block address (LBA) that is mapped to a particular physical location within the storage system's physical storage resources.

The storage system may be designed to include redundancy and/or erasure coding to protect against loss of data from physical storage device failures (e.g., hard disk failures in the case of a disk drive or disk drive array, or, flash memory device failure in the case of an SSD or SSD array). In the case of redundancy, multiple copies of a particular data item are stored in different locations of the physical storage resources. For example, in the case of a disk drive array, a first copy of the data is kept on a first drive of the array, and, a second copy of the data is kept on a second drive of the array.

As more "replicas" of data are stored by the storage system, the storage system is better able to guarantee against data loss (i.e., is made more reliable). That is, for instance, a disk drive array composed of three drives, where the first drive is used to store the data and the second and third drives only maintain copies of the data stored in the first drive (200% redundancy), has better reliability against data loss than a disk drive array composed of two drives where the first drive is used to store the data and the second drive is used to store a copy of the data stored in the first drive (100% redundancy).

In the case of erasure coding, a special code is calculated from separately stored data and then stored in its own separate location. For example, in a disk drive array composed of five drives, a mathematical computation is performed on the data in block A of the first through fourth drives. The resultant of the computation (the erasure code) is then stored in block A of the fifth drive. If any one of the first through fourth drives fail, the data in block A of the failing drive can be recovered by processing the block A data of the non-failing drives with the erasure code according to a recovery computation that is mathematically related to the erasure code computation.

Generally, as the amount of erasure coding information per amount of customer data increases, the amount of lost data that can be recovered increases. For instance, as a simplistic example, assume the erasure code of the above described disk array can be used to recover data lost from the failure of any one of the first through fourth drives, but, cannot recover the data lost from the simultaneous failure of any two or more of the first through fourth drives.

By contrast, if a second erasure code was computed and stored on a sixth drive, conceivably, the data lost from the simultaneous failure of any two of the first through fourth drives could be recovered by processing the data of the remaining two non failed drives of the first through fourth drives combined with the erasure code in the fifth drive and the erasure code in the sixth drive. Thus, the more storage capacity that is used to store erasure code information the greater the reliability of the storage system.

Various combinations of redundancy and erasure coding can be used to configure a storage system with a particular reliability level. Here, generally, storage systems configured to utilize a greater percentage of storage capacity for redundant data or erasure code information will exhibit greater reliability than storage systems configured to utilize a lesser percentage of storage capacity for redundant data or erasure code information.

Additionally, a wide range of redundancy options are possible (e.g., first, second, third, etc. additional drives for storing replicas) and a wide range of data-to-erasure coding ratio options are possible (two, three, four, etc. blocks of data per erasure coding). For example, the industry term "RAID 0" is understood to define a first (e.g., lowest) reliability level that does not have any redundancy or erasure coding, "RAID 1" is understood to define 100% redundancy in which each stored data item has a single stored replica, "RAID 4" is understood to define one drive of erasure code information that protects multiple drives of stored data, "RAID 5" is understood to interleave erasure code information and data amongst a same set of drives and "RAID 6" is understood to mimic RAID 5 but includes more erasure code information interleaved with the data amongst the drives As such, a wide range of reliability levels are possible, where, each unique combination of redundancy and data-to-erasure coding ratio corresponds to a unique and different reliability level (reliability levels can also be further delineated with different types of erasure code computations).

A problem, however, is that the entire storage system is traditionally configured with a particular reliability level that is appropriate for the most sensitive data that the storage system is expected to store. As such, a storage system may be configured with a very high reliability level (e.g., RAID 1) simply because it will store "some" data that needs to be guaranteed. Because the cost of a storage system increases with reliability (increasingly higher percentages of physical storage resources are used to store redundant or erasure code information than customer data), the traditional approach can be particularly inefficient for storage systems that will store only a small amount of highly sensitive data and much larger amounts of data where the sensitivity to loss is marginal or non-existent.

For example, if 99% of a storage system's customer data has little/no sensitivity to data loss and only 1% of the customer is highly sensitivity to data loss, the storage system will be configured to exhibit a reliability level that is appropriate for the 1% of highly sensitive data (e.g., RAID 1). Although the reliability of the highly sensitive data is guaranteed to the correct reliability level, it comes at the expense of "over-protecting" the 99% of the data for which little/no data loss sensitivity exists (e.g., RAID 0, RAID 4 or RAID 5 would otherwise be sufficient for the 99% that is not highly sensitive to data loss). As such, much of the storage system's physical storage capacity is wasted keeping redundant and/or erasure code information for the 99% of the data which has little sensitivity to data loss.

Irrespective of the above extreme example, inefficiency exists whenever data is being protected at a reliability level that is greater than what is actually needed. Here, more typically, a storage system stores various kinds of different data, some of which are adequately protected at lesser reliability levels than what is appropriate for other kinds of data stored by the storage system. For example, if a storage system keeps video files, the corruption/loss of some data in a few non-base image frames of the video is perfectly acceptable, whereas, the corruption/loss of mission critical meta-data or the base image frame of a video file is unacceptable. As such the former is most efficiently protected at a lesser reliability level (e.g., any of RAID 0, RAID 4 or RAID 5) whereas the later is most efficiently protected at a much higher reliability level (e.g., RAID 1).

FIG. 1 shows a depiction of a single storage system 101 that is capable of protecting the data it stores at different reliability levels. Here, as observed in FIG. 1, the storage system's physical storage resources 101 (e.g., disk drives, flash memory chips, one or more disk drive arrays, one or more SSDs, one or more SSD arrays, etc.) are divided into N different reliability zones 101_1 through 101_N. Each of the N reliability zones provides a different level of reliability than any of the other N−1 reliability zones. In general, the reliability zone 101_1 that provides the highest reliability level (e.g., RAID 1) will have a noticeably greater percentage of its storage capacity devoted to redundant and/or erasure code information that the reliability zone 101_N that provides the lowest reliability level (e.g., RAID 0).

In various embodiments, the storage system 101 is a single storage system such that each item of uniquely stored data within the system is accessed with a unique directory/filepath (in the case of a file system) or object_ID (in the case of an object storage system). As will be described in more detail further below, reliability levels are assigned to individual data items so that each data item receives its appropriate level of reliability protection. Because reliability levels are assigned to different data items individually, data items that are stored close to one another architecturally in the storage system may receive customized and different reliability protection.

For example, two different data items that are stored in a same file of a file system may be protected with different levels of protection (e.g., one data item is protected at one RAID level and the other data item is protected at another RAID level). As another example, two files that are immediately located under the same sub-directory may be protected with different reliability levels (e.g., one file is protected at one RAID level and the file is protected at another RAID level).

Further still, in various embodiments, the reliability levels that are assigned to certain data items can be dynamically changed during the run-time of the storage system. Additionally, also as described in more detail further below, new reliability levels/zones may be added, existing reliability levels/zones may be dropped/discontinued, and/or the storage capacities of the reliability zones may be adjusted.

As observed in FIG. 1, the management function 106 of the storage system 100 includes a number of extensions beyond a traditional storage system's management function. In particular, the management function includes: 1) separate zone space allocators 102_1 through 102_N for each reliability zone that respectively track each zone's capacity usage; 2) a zoning agent 103 that determines how many reliability zones exist and determines their respective reliability levels and storage capacities; and, 3) a read/write request mapping unit 104 having a lookup function 105 that converts a received request LBA into a physical block address (PBA), where, at least in some embodiments, the physical block address has a component that specifies, indicates or otherwise reflects what reliability zone the data item is stored within.

In various embodiments, when the storage system receives an item of data for the first time (a new data item to be added to the storage system (e.g., a PUT)), the data item is appended not only with an LBA but also an indication of the appropriate reliability level for the data item. In various embodiments, the application software program that is creating the data, or a lower platform level software program that the application runs on top of, determines the reliability level for the data item and includes it with the PUT request. In various embodiments, the PUT request of new data takes the form of PUT(LBA,RL) where PUT signifies that a new item of data is to be uniquely written into the storage system (instead of modifying an existing item of data), LBA is the logical block address of the data item and RL is the indication of the new data item's reliability level.

In response to the receipt of the PUT command, the R/W mapping logic 104 determines an appropriate physical block address (PBA) for the data item. Here, in various embodiments, the PBA is a function of the reliability level. That is, in various embodiments, the physical storage resources are physically partitioned, in some way, such that items of data stored in a same reliability zone will have similar and/or identical higher ordered bits of their respective PBAs (e.g., RZ_ID in FIG. 1).

As a simplistic example, consider a large data center implementation where the physical storage resources 101 are implemented as a large inter-networked collection of disk drive arrays. Here, disk drives within a same array are assigned to a same reliability zone such that groups of different disk arrays physically define the reliability zones, and, delineation between reliability zones are realized on a disk array by disk array basis. Additionally, a network of some complexity can exist between the management function 106 and the storage system resources 101 (disk arrays). If the network destination of a request (which terminates at the correct reliability zone) is based on the PBA (e.g., the PBA is included in the destination address or is mapped to a destination address value), the PBA itself will include information that specifies, indicates or otherwise relates to the reliability level of its respective data item. That is, in order to physically route the request to the hardware associated with the correct reliability level, the correct reliability level is reflected in the data item's associated PBA.

As such, in response to a request to write a new item of data into the storage system, the reliability level that is included in the request is used to determine a component of the data item's PBA. Other factors, such as the physical addresses of available space in the targeted reliability zone, are used to determine other (e.g., lower ordered) bits of the PBA. Thus, the PBA may be a data construct that reserves higher order bits to indicate the reliability zone and reserves lower ordered bits to specify a particular storage location within the reliability zone.

The mapping of the data item's LBA to PBA is then recorded in the lookup function 105. The lookup function 105, in various embodiments, is implemented as a searchable tree structure (e.g., B-tree, balanced interval tree, etc.) where the LBA value is used to navigate through the tree to obtain the LBA's corresponding PBA. In other embodiments, the lookup function 105 is implemented as a straight look-up from a table having one entry for every LBA/PBA pair.

Also associated with the write of a new data item into a specific reliability zone is the zone space allocator for the targeted reliability zone adjusting its list of free space within the targeted reliability zone. For example, if a new data item is to be written into reliability zone 101_2, reliability zone allocator 102_2 will decrement a count of available free space in reliability zone 101_2 in accordance with the size of the data item being written (which can also be specified in the PUT request). Moreover, the reliability zone allocator 102_2 may keep a record of available locations (e.g., local PBAs) within its corresponding reliability zone.

In this case, as part of processing the new data item's write request, mapping logic 104 pings the allocator 102_2 of the targeted zone to request a local PBA for the data item. In response, the allocator 102_2 selects a local PBA associated with free space in its associated reliability zone and returns it to the mapping logic 104 which incorporates it, e.g., as the lower ordered bits of the data item's (full) PBA as recorded in the mapping logic 105 (the higher ordered bits in the mapping logic's full PBA, as discussed above, can reflect the targeted reliability zone 102_2). The allocator 102_2 then removes the local PBA it provided to the mapping logic 104 from its free space list.

If the free space list indicates the reliability zone is getting low on free space, the allocator 102_2 can raise a flag to the zoning agent 103 which, in response, reallocates the storage system's physical resources 101. For example, the zoning agent 103 may ping all other allocators 102 in the system to understand how much free space currently exists in all of the reliability zones. If one of the other reliability zones has plenty of free space, the zoning agent 103 may reconfigure some of the storage resources 101 to implement the reliability scheme of the reliability zone 101_2 that is getting low on free space.

After the initial write of a new data item, subsequent requests directed to the data item (e.g., read operations, modify operations, delete operations etc.) need not include the reliability level because the LBA/PBA relationship for the data item is already recorded in the lookup function 105. That is, the read/write request mapping logic 104 simply uses the LBA that was received with the request as a look-up parameter into the look-up function 105 which returns the data item's PBA in response.

In response to a delete operation made to the data item, the resource allocator of the data item's reliability zone adds the local PBA associated with the data item to its free list. As such, a subsequent request to create another new data item in the reliability can be handled by providing the local PBA of the deleted item. The new data item will then be written over the deleted data item.

In some instances the reliability level of a data item may change. In this case, according to an embodiment, the new reliability level for the data item is included in the next read request or modify request directed to the data item. For example, the storage system receives a read command of the form READ(LBA, new_RL) or a modify command of the form MODIFY(LBA, new_RL), where new_RL is the new reliability level that is to be used to protect the data item (the new level can be more or less protection). In response, the mapping logic 104 determines a new PBA for the data item according to the standard PUT process described above. The entry in the lookup function 105 for the data item is updated to reflect the new PBA for the data item's LBA.

The data item is then read from its current location in its prior reliability zone and written into its new reliability zone according to its new PBA. If the request is a read the data item is also provided as a response to the request. If the request is a modify the data item is updated before it is written into its new location. In other or combined embodiments the storage system supports a new reliability zone command that simply moves the data item to its new location as described above but without following through on an associated read or modify command (as no read or modify is associated with a new reliability zone command). Here, the new reliability zone command may take the form of NRL(LBA, new_RL) where LBA is the data item's LBA and new_RL is the new reliability RL for the data item.

In any of the embodiments described above there may not be a reliability zone for every reliability level that can be specified to the storage system. In this case, the management function 106 will assign a reliability zone having a reliability scheme that provides the same or higher level of protection than that specified for the data item by the requestor.

In an embodiment, in order to support the dynamic change in size of reliability zones, each reliability zone is divided into a number of sub-zones and the allocators 102 are designed to incrementally fill the sub-zones on a sub-zone by sub-zone basis (a new data item is not written into a next sub-zone until the current sub-zone is filled). Likewise, the allocators 102 support a background process whereby deleted data items in more densely populated sub-zones are overwritten with data items in less densely populated sub-zones (a corresponding PBA update of the mapping table 105 transpires as well). So doing will have the general effect of keeping many sub-zones in either a full state or an empty state. Here, the deliberate creation of completely empty sub-zones allows for these sub-zones to be assigned to another reliability zone to expand the other reliability zone's capacity.

Figure 2:
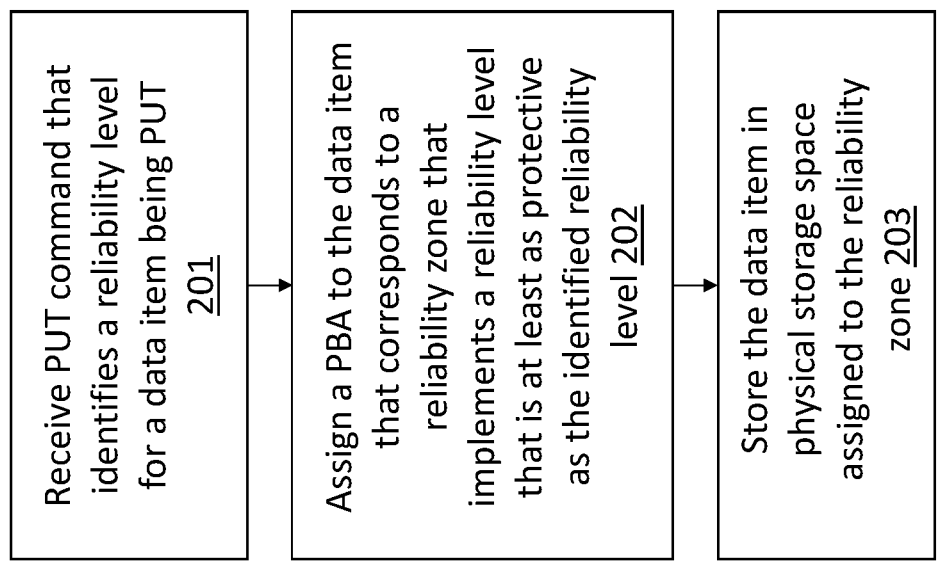
FIG. 2 shows a first method that can be performed by the storage system of FIG. 1.

FIG. 2 shows a PUT process as described above. According to the methodology of FIG. 2, a PUT command 201 is received that identifies a reliability level for the data item being PUT. A PBA is then assigned 202 to the data item where the PBA corresponds to a reliability zone that implements a reliability level that is at least as protective as the identified reliability level. The data item is then stored 203 in the physical storage space assigned to the reliability zone.

Figure 3:
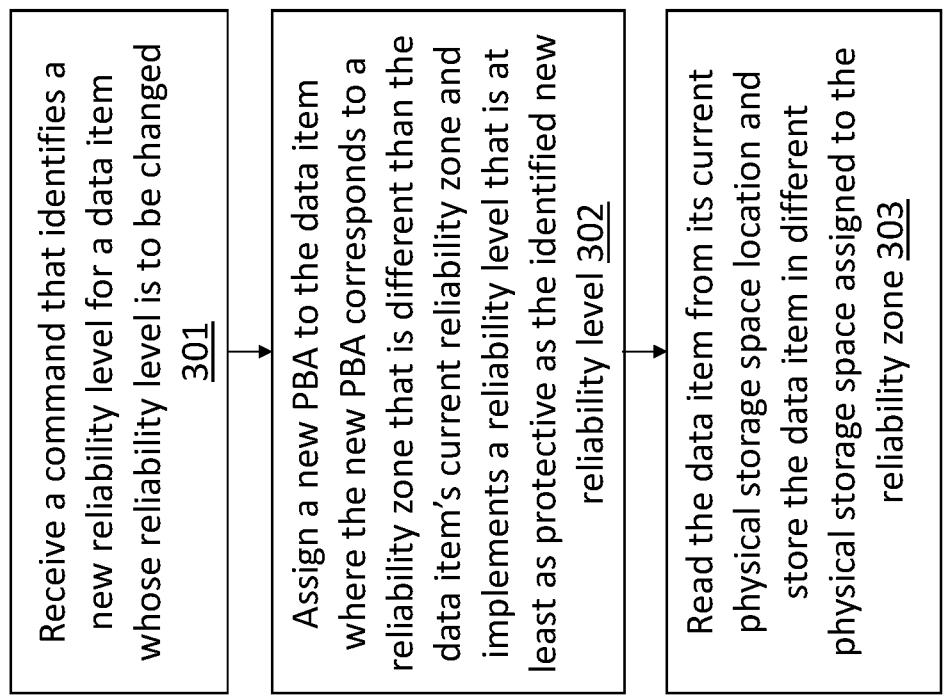
FIG. 3 shows a second method that can be performed by the storage system of FIG. 1.

FIG. 3 shows change process for changing the reliability level of a data item as described above. According to the methodology of FIG. 3, a command is received that indicates a new reliability level for a data item whose reliability level to be changed 301. A new PBA is then assigned 302 to the data item where the new PBA corresponds to a reliability zone that is different than the data item's current reliability zone and implements a reliability level that is at least as protective as the identified reliability level. The data item is then read from its current physical storage space location and stored 203 in different physical storage space assigned to the reliability zone.

Any of the zone space allocators 102, zoning agent 103 and mapping logic 104 may be implemented with dedicated hardwired logic circuitry (e.g., application specific integrated circuits (ASICs), one or more logic circuit state machines, etc.), programmable logic circuitry (e.g., field programmable logic circuitry (FPGA)), or logic circuitry design to execute program code (e.g., a multi-core processor having a plurality of general purpose processing cores) where the program code is written to perform functions of the allocators, zoning agent and/or mapping logic, or any combination of these. Thus any of the zone space allocators 102, zoning agent 103 and mapping logic 104 may be implemented in hardware, software or combination thereof.

Figure 4:
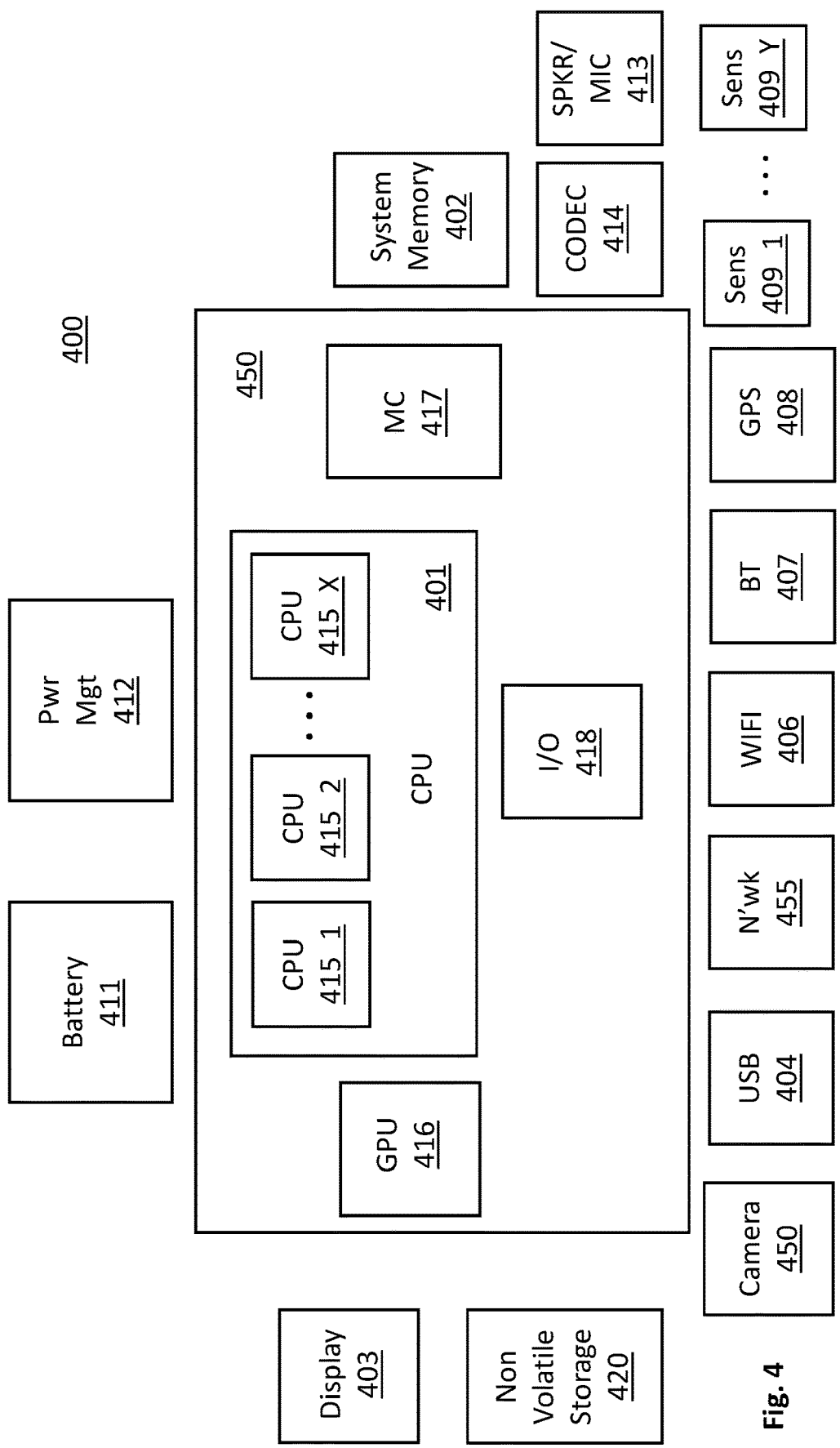
FIG. 4 shows a computing system.

FIG. 4 provides an exemplary depiction of a host computing system 400 (e.g., a smartphone, a tablet computer, a laptop computer, a desktop computer, a server computer, etc.). As observed in FIG. 4, the basic computing system 400 may include a central processing unit 401 (which may include, e.g., a plurality of general purpose processing cores 415_1 through 415_X) and a main memory controller 417 disposed on a multi-core processor or applications processor, system memory 402, a display 403 (e.g., touchscreen, flat-panel), a local wired point-to-point link (e.g., USB) interface 404, various network I/O functions 405 (such as an Ethernet interface and/or cellular modem subsystem), a wireless local area network (e.g., WiFi) interface 406, a wireless point-to-point link (e.g., Bluetooth) interface 407 and a Global Positioning System interface 408, various sensors 409_1 through 409_Y, one or more cameras 410, a battery 411, a power management control unit 412, a speaker and microphone 413 and an audio coder/decoder 414.

An applications processor or multi-core processor 450 may include one or more general purpose processing cores 415 within its CPU 401, one or more graphical processing units 416, a memory management function 417 (e.g., a memory controller) and an I/O control function 418. The general purpose processing cores 415 typically execute the operating system and application software of the computing system. The graphics processing unit 416 typically executes graphics intensive functions to, e.g., generate graphics information that is presented on the display 403. The memory control function 417 interfaces with the system memory 402 (also referred to as main memory) to write/read data to/from system memory 402. The power management control unit 412 generally controls the power consumption of the system 400.

Each of the touchscreen display 403, the communication interfaces 404-407, the GPS interface 408, the sensors 409, the camera(s) 410, and the speaker/microphone codec 413, 414 all can be viewed as various forms of I/O (input and/or output) relative to the overall computing system including, where appropriate, an integrated peripheral device as well (e.g., the one or more cameras 410). Depending on implementation, various ones of these I/O components may be integrated on the applications processor/multi-core processor 450 or may be located off the die or outside the package of the applications processor/multi-core processor 450. The computing system also includes non-volatile storage 420 which may be the mass storage component of the system. The non-volatile storage 420 may be designed to assign unique reliability levels to individual data items and/or individual files, etc. as described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., field programmable gate array (FPGA), programmable logic device (PLD)) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising
a storage system management unit to manage a storage system having physical storage resources divided into different reliability zones, wherein, a data item to be stored in the storage system is to be assigned a particular reliability level by the storage system management unit and is to be stored by the storage system management unit in one of the reliability zones that is to provide a level of protection against data loss that is at least as protective as the particular reliability level, wherein, the reliability level of the data item is changeable, and wherein, in order to change the data item's reliability level, the storage system management unit is to determine a different reliability zone for the data item and move the data item from the one of the reliability zones to the different reliability zone, and wherein, the move of the data item includes physically moving the data item from one physical storage location to another physical storage location.

2. The apparatus of claim 1 wherein a requester that requests storage of the data item in the storage system identifies the reliability level.

3. The apparatus of claim 2 wherein the reliability level is identified with a command that requests the data item to be first written into the storage system.

4. The storage system of claim 1 wherein the data item is storable in a same file with another data item having a different reliability level than the data item's reliability level.

5. The storage system of claim 4 wherein the data item's reliability level is a RAID level and the another data item's reliability level is a different RAID level.

6. The storage system of claim 1 wherein the different reliability zones comprise a first reliability zone that supports a first erasure coding scheme and a second reliability zone that supports a second, different erasure coding scheme.

7. The storage system of claim 1 wherein the physical storage resources comprise disk arrays.

8. The storage system of claim 1 wherein the physical storage resources comprise SSDs.

9. The storage system of claim 1 wherein the storage system management unit comprises:
a zoning agent to establish protection levels of the reliability zones;
allocators to track available storage space in the reliability zones.

10. The storage system of claim 1 wherein the data item's physical block address (PBA) includes a component that identifies the one of the reliability zones.

11. The storage system of claim 1 wherein respective storage capacities of the reliability zones are dynamically adjustable.

12. A system, comprising:
a plurality of processing cores;
a main memory;
a main memory controller coupled between the plurality of processing cores and the main memory;
a network interface;
a storage system having physical storage resources divided into different reliability zones, wherein, a data item to be stored in the storage system is to be assigned a particular reliability level and is to be stored in one of the reliability zones that is to provide a level of protection against data loss that is at least as protective as the particular reliability level, wherein, the reliability level of the data item is changeable, and wherein, in order to change the data item's reliability level, the storage system having a management unit that is to determine a different reliability zone for the data item and move the data item from the one of the reliability zones to the different reliability zone, and wherein, the move of the data item includes physically moving the data item from one physical storage location to another physical storage location.

13. The system of claim 12 further comprising a network between the network interface and the storage system.

14. The system of claim 12 wherein the data item is storable in a same file with another data item having a different reliability level than the data item's reliability level.

15. The system of claim 14 wherein the data item's reliability level is a RAID level and the another data item's reliability level is a different RAID level.

* * * * *